United States Patent [19]

Alexandris

[11] Patent Number: 4,594,945

[45] Date of Patent: Jun. 17, 1986

[54] THERMAL PROTECTION FOR PROPELLANT GRAINS

[75] Inventor: George Alexandris, Redlands, Calif.

[73] Assignee: General Dynamics, Pomona Division, Pomona, Calif.

[21] Appl. No.: 676,028

[22] Filed: Nov. 28, 1984

[51] Int. Cl.⁴ .............................................. C06B 45/12
[52] U.S. Cl. ................................... 102/287; 102/289; 102/290; 102/291; 60/253
[58] Field of Search .................. 60/253; 102/289, 291, 102/292, 290, 287

[56] References Cited

U.S. PATENT DOCUMENTS

| | | | |
|---|---|---|---|
| 1,335,785 | 4/1920 | Hedberg | 102/98 |
| 1,840,479 | 1/1932 | Weber | 102/24 |
| 2,078,240 | 4/1937 | Fleming | 102/6 |
| 2,211,737 | 8/1940 | Berkley | 52/11 |
| 2,357,068 | 8/1944 | Barah | 102/24 |
| 2,398,297 | 4/1946 | Finlay | 102/95 |
| 2,643,611 | 6/1953 | Ball | 102/98 |
| 3,157,127 | 11/1964 | Proell | 102/98 |
| 3,172,255 | 3/1965 | Priapi | 60/35.6 |
| 3,263,613 | 8/1966 | Rice et al. | 102/98 |
| 3,324,795 | 6/1967 | Miles et al. | 102/65 |
| 3,430,445 | 4/1969 | Smith | 60/245 |
| 3,609,977 | 10/1971 | McCormick | 60/245 |
| 3,815,506 | 6/1974 | Tamulevich | 102/103 |
| 3,965,676 | 6/1976 | Schaffling | 60/255 |
| 3,991,565 | 11/1976 | Gordon | 60/255 |
| 4,054,029 | 10/1977 | Sayles | 60/253 |
| 4,085,584 | 4/1978 | Jones | 60/250 |
| 4,458,483 | 7/1984 | Vetter | 60/253 |
| 4,478,151 | 10/1984 | Vetter et al. | 102/291 X |

Primary Examiner—Peter A. Nelson
Attorney, Agent, or Firm—Neil F. Martin; John R. Lindsay; Edward B. Johnson

[57] ABSTRACT

A thin frangible cork barrier conforming to the contour of the burning surface of individual solid propellant grains in a multiple grain rocket motor prevents premature ignition of the protected grain by the heat of combustion of previously ignited adjacent grains and is expelled through the rocket motor nozzle upon ignition of the protected grain. In a second embodiment, the thermal protection afforded by the frangible cork barrier is augmented by bonding to a thermally-protective elastomer layer which is in turn bonded to the propellant grain burning surface. By virtue of the composition and structure of the embodiments, thermal protection is afforded. Upon ignition of a protected grain the thermal barrier breaks up so as to pass readily through the throat of a small motor nozzle.

8 Claims, 4 Drawing Figures

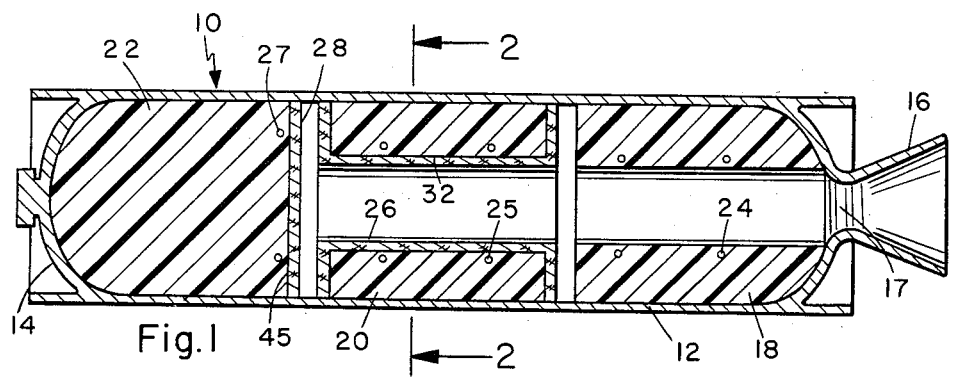
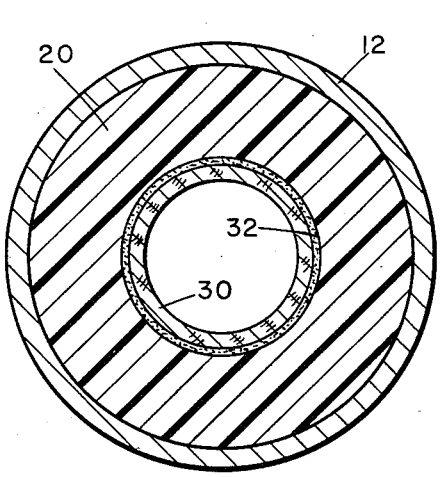
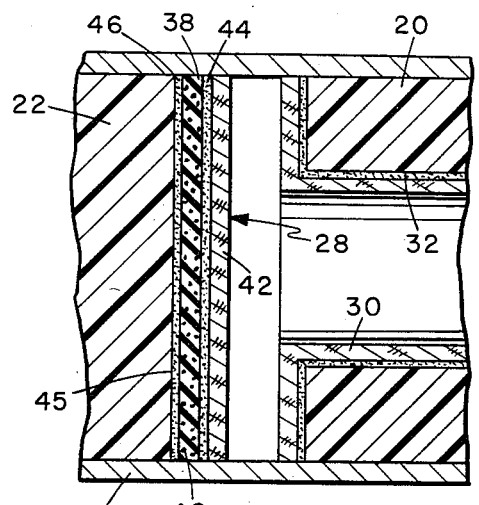
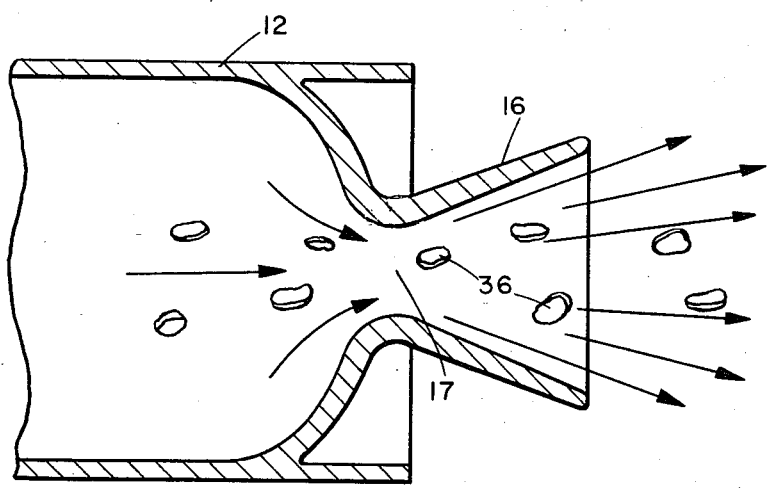

THERMAL PROTECTION FOR PROPELLANT GRAINS

The Government has rights to this invention pursuant to Contract No. N00019-83-C-0420 awarded by the U.S. Navy.

BACKGROUND OF THE INVENTION

In small rocket propelled missile systems such as used in point defense weapons, it is desirable to have two or more separately ignited thrust pulses supplied by the rocket motor in order to achieve selectable kinetic management capability and the required maneuverability for the missile at high altitude and in long range air to air engagement. To provide these capabilities, two or more radially or end burning solid propellant segments or grains, or combinations thereof, are ignited and burned in sequence. A tandem arrangement of the propellant grains within the rocket motor casing is the most common configuration, although a radial arrangement of successively burned grains could also be employed. A critical aspect of such a multiple grain design is provision for the thermal protection of individual propellant grains during the burning of the preceding grain or grains, and during any inter-pulse interval, in order to prevent premature ignition of the propellant grain which could result in destroying the propulsion characteristics of the rocket motor or the motor itself.

Currently available designs of thermal protection for solid propellant rocket grains are based upon enclosing the propellant burning surface in a thermal layer constructed of an elastomer such as butyl, polyisoprene, or polybutadiene with insulating material dispersed therein such as silica and asbestos. While such materials provide requisite thermal protection, they present a nearly unsolvable problem following completion of their design function in small rocket motors since they must either be successfully retained in the rocket motor casing or expelled through the rocket motor nozzle throat. The first alternative is rarely accomplished with consistent success, and the second alternative is successful only when the nozzle throat is large enough to permit ejection of the protective thermal material. With small nozzle throats under one inch in diameter such as are encountered in anti-missile point defense systems, a throat blockage may lead to a potentially catastrophic motor chamber pressure spike or to combustion instability. With such small nozzles the strength of the elastomer used in the required thickness to provide thermal protection prevents the layer breaking up into small enough pieces to be ejected through the motor nozzle.

To provide the necessary inter-grain thermal protection while overcoming the foregoing disadvantages, it is desirable to provide a thermal barrier for individual propellant grain combustion surfaces, either alone or in combination with an elastomer layer which has mechanical properties allowing fracture of the barrier on ignition of the protected propellant grain into fragments sufficiently small to pass through nozzle throats of less than one inch in diameter. Applicant's invention meets this criteria in addition to providing other valuable characteristics that minimize interference with the motor design and propellant burning characteristics.

SUMMARY OF THE INVENTION

According to the invention, thermal protection is provided for the burning surfaces of adjacent sequentially fired multiple propellant grains in a rocket motor by a barrier that is readily expelled through the motor thrust nozzle when the grain is ignited. The thermal protection afforded is sufficient to prevent the premature or unplanned ignition of an individual grain due to the burning of a previously ignited grain in the course of the missile flight. In the exemplary embodiment, a thin heat resistant frangible layer of cork is bonded by a suitable adhesive to and covers the burning surface of the protected propellant grain. At planned ignition of the grain, the nature of the frangible cork layer is such that breaks up into fragments sufficiently small to pass through the throat of the motor nozzle and be expelled without interfering with the operating characteristics of the rocket motor. According to a further precept of the invention, necessary increased thermal protection may be afforded by combining the insulating properties of the cork barrier with that of a thin elastomer layer bonded to and conforming with the propellant burning surface to which the cork layer is in turn bonded by a suitable adhesive. The combined thermal protection of the laminated layers is sufficient to protect the grain from the heat of the burning of previously ignited grain, but permitting sufficiently thin construction of the barrier so as to break up into small pieces and pass through the motor nozzle when the protected grain is ignited.

It is, therefore, an advantage of the invention to provide a new and improved thermal protection barrier for rocket motor grains in the form of a readily frangible thermal barrier. In an exemplary embodiment, a thin frangible barrier of cork covering the propellant grain burning surface is provided which is light in weight, inert, and relatively inexpensive. The thin cork barrier conforms readily to the shape of a propellant grain burning surface which facilitates manufacture. The material is available, easily bonded to the propellant grain, and adheres well during thermal cycling in storage. The cork elastomer laminate construction of the second embodiment provides increased thermal protection while maintaining the frangible characteristics of the barrier.

Other features and attendant advantages of the invention will become more apparent upon a reading of the following detailed description in conjunction with the drawings, in which like reference numerals refer to like parts throughout, and in which:

FIG. 1 is a longitudinal sectional view of a rocket motor showing the thermal barrier arrangement;

FIG. 2 is an enlarged sectional view taken on line 2—2 of FIG. 1;

FIG. 3 is an enlarged view of a portion of FIG. 1; and

FIG. 4 is an enlarged sectional view of the exhaust nozzle, showing ejection of the thermal barrier material.

DETAILED DESCRIPTION OF THE DRAWINGS

A representative small rocket motor 10 is illustrated in FIG. 1. The associated missile components are not shown. The motor consists of a casing 12 closed at the forward end 14 and having a propulsion nozzle 16 with a throat section 17 at the opposite end. Three independently and sequentially ignited solid propellant grains 18, 20 and 22 are depicted as cast in tandem within the casing 12 to provide launch, boost and sustained missile flight. Combustion of the individual propellant grains is initiated in proper sequence by ignitors 24, 25 and 27 activated by missile control circuitry not shown. For purposes of illustration, the burning of grain 18 would launch the missile, followed by the ignition and burning of grains 20 and 22 to sustain the flight of the missile. Propellant grains 18 and 20 are illustrated as being of the radial burning type, while grain 22 is depicted as an end burning propellant grain.

Since propellant grain 18 is the first to be burned, no thermal protection is required to prevent inadvertent ignition of grain 18 by the burning of adjacent grains 20 and 22. To prevent the premature ignition of propellant grains 20 and 22 by the combustion products of grain 18, their burning surfaces are protected by frangible thermal barriers 26 and 28 as will be subsequently described in greater detail.

The application of the barrier 26 to the burning surfaces of propellant grain 20 is further illustrated in FIG. 2 and the right hand portion of FIG. 3. The barrier 26 of the first illustrated embodiment is formed by a single layer 30 of pressed ground cork covering the burning surface 32 of propellant grain 20 and bonded thereto by a suitable adhesive layer 34. In the illustrated embodiment the cork layer 30 is formed of pressed cork granules held together by a thermosetting phenolic binder. The layer 30 has a thickness of between one eighth and one quarter inch, a maximum density range of 28-32 pounds per cubic foot, and a maximum tensile strength of 250 lbs per square inch. The minimum specific heat of the layer 30 is 0.45 British Thermal Units per pound per degree Fahrenheit. With the foregoing characteristics, the layer 30 can be readily bonded to the propellant grain burning surface 32 to provide thermal protection for the surface, yet will break up into small segments 36, FIG. 4, upon the ignition and burning of the propellant grain 20. Thus the segments 36 can be expelled from the interior of the motor 10 without adversely influencing the burning of grain 20 or the thrust characteristics of the motor.

A second embodiment of the invention is illustrated in FIG. 1 and the left hand portion of FIG. 3. This embodiment is particularly useful in situations wherein greater thermal protection is necessary due to the composition of a particular propellant grain. In this embodiment enhanced thermal protection is provided by barrier 28 which is formed as a laminar combination of a thin elastomer layer 38 containing dispersed thermal protective materials 40 and a cork layer 42. The elastomer layer has a maximum thickness of 0.030 inch, and the combined thickness of the layers 38 and 42 does not exceed three eighths of an inch. Layers 38 and 42 are bonded together by an adhesive illustrated at 44, and the combined protective barrier 28 covers the combustion surface 45 of the propellant grain 22 being secured thereto by a suitable adhesive 46. The thermal protection afforded by the laminar barrier 28 is increased while at the same time permitting each of the components thereof to be thinner such that they break up into small segments 36 that will pass through the nozzle 16 when the propellant grain 22 is ignited.

OPERATION

The operation of the thermal barrier of the present invention will be described with reference to FIGS. 1, 3 and 4. FIG. 1 illustrates a missile rocket motor 10 having three solid propellant grains 18, 20 and 22 which are burned in programmed sequence by the action of igniters 24, 25 and 27. To prevent the heat of combustion gases of grain 18 from igniting the grains 20 and 22, the combustion surface of the former grain is protected by a cork layer 30, while the end burning grain 22 is protected by a cork layer 42 combined with an elastomer layer 38. The construction of the thermal barriers for propellant grains 20 and 22 is such that they protect the grain until it is ignited and burned, at which time they fragment into small segments 36 so as to be expelled from the motor casing 12 via the nozzle 16 as illustrated in FIG. 4.

Having described the invention, what is claimed is:

1. Thermal protection for use with a protected grain of a multiple grain solid propellant rocket motor having a single combustion chamber and thrust nozzle, comprising:

a flexible frangible barrier layer of pressed granular material held together by a binder material and bondable over the combustion surface of the protected grain said layer comprising means for preventing ingition of said combustion surface by the burning of an adjacent propellant grain and means for fracturing into small pieces to be propelled out through the thrust nozzle on ignition of the protected grain, and means for bonding said barrier layer over the entire area of said protected grain surface.

2. Thermal protection for use with a protected grain of a multiple grain solid propellant rocket motor as recited in claim 1, wherein:

said barrier is formed of a layer of material having a maximum density of between 28 to 32 pounds per cubic foot, a maximum tensile strength of 250 pounds per square inch, and a minimum specific hear value of 0.45 British Thermal Units per pound per degree Fahrenheit.

3. Thermal protection for use with a protected grain of a multiple grain solid propellant rocket motor as recited in claim 1, wherein:

said barrier comprises a layer of pressed granular cork held together by a binder material.

4. Thermal protection for use with a protected grain of a multiple grain solid propellant rocket motor as recited in claim 3, wherein:

said cork layer has a maximum thickness of one quarter inch.

5. Thermal protection for use with a protected grain of a multiple grain solid propellant rocket motor as recited in claim 1 wherein said bonding means includes a thermally resistant elastomer layer bonded between said protected grain combustion surface and said frangible barrier.

6. Thermal protection for use with a protected grain of a multiple grain solid propellant rocket motor as recited in claim 5 wherein:

said elastomer layer thickness does not exceed 0.030 inch, and the combined thickness of said elastomer layer and said frangible barrier does not exceed three eighths of an inch.

7. A rocket motor comprising:

a housing defining a combustion chamber having an exhaust nozzle at one end and a reduced diameter throat connecting the exhaust nozzle to the combustion chamber;

a series of at least two propellant grains in the combustion chamber for independent and sequential ignition;

a flexible frangible barrier layer bonded to cover the combustion surface of at least one of the propellant grains the barrier layer comprising a layer of pressed granular cork held together by a binder material and a bonding layer bonding the cork layer over the entire exposed combustion surface of the propellant grain, and the barrier layer comprising means for preventing ignition of said combustion surface by the burning of an adjacent propellant grain and means for fracturing into small enough pieces for ejection through the reduced diameter nozzle on ignition of the underlying propellant grain combustion surface.

8. The rocket motor as claimed in claim 7, wherein there are three propellant grains and each of the two innermost grains has a barrier layer bonded to its combustion surface at least one of the protected grains being of the radial burning type.

* * * * *